US007764414B2

(12) United States Patent
Kusunose et al.

(10) Patent No.: US 7,764,414 B2
(45) Date of Patent: Jul. 27, 2010

(54) ILLUMINATION APPARATUS AND ILLUMINATION METHOD

(75) Inventors: Haruhiko Kusunose, Kanagawa (JP); Kiwamu Takehisa, Kanagawa (JP)

(73) Assignee: Lasertec Corporation, Kanagawa (JP)

( * ) Notice: Subject to any disclaimer, the term of this patent is extended or adjusted under 35 U.S.C. 154(b) by 399 days.

(21) Appl. No.: 11/959,051

(22) Filed: Dec. 18, 2007

(65) Prior Publication Data

US 2008/0144148 A1 Jun. 19, 2008

(30) Foreign Application Priority Data

Dec. 19, 2006 (JP) ............................. 2006-341451

(51) Int. Cl.
*G02B 26/08* (2006.01)
(52) U.S. Cl. .................................. 359/207.7
(58) Field of Classification Search ............. 359/197.1, 359/205.1, 207.7
See application file for complete search history.

(56) References Cited

U.S. PATENT DOCUMENTS 6,946,634 B2 * 9/2005 Matsui .................... 250/201.5
2002/0024979 A1 * 2/2002 Vilhelmsson et al. ......... 372/20

FOREIGN PATENT DOCUMENTS

| JP | 02-188714 A | 7/1990 |
|---|---|---|
| JP | 2000-231065 A | 8/2000 |
| JP | 2000-275444 A | 10/2000 |
| JP | 2002-031730 A | 1/2002 |
| JP | 2003-059799 A | 2/2003 |
| JP | 2003-511740 A | 3/2003 |
| JP | 2005-308967 A | 11/2005 |
| JP | 2006-053495 A | 2/2006 |
| WO | 00/70660 A1 | 11/2000 |
| WO | 2006/090681 A1 | 8/2006 |

OTHER PUBLICATIONS

"Optical Technique Contact", vol. 33, No. 2, pp. 41-44.

* cited by examiner

*Primary Examiner*—Euncha P Cherry
(74) *Attorney, Agent, or Firm*—Sughrue Mion, PLLC

(57) ABSTRACT

According to one aspect of the present invention, there is provided an illumination apparatus 110 including a laser source 11, a two dimensional diffraction optics 13 on which laser beam from the laser source is made incident, a rectangular rod 14 on which diffraction beams from the two dimensional diffraction optics 13 are made incident and through which incident beams travel while repeating total reflection, and a galvano mirror 12 changing an incident position of the diffraction beams from the two dimensional diffraction optics 13 in an incident end surface of the rectangular rod 14.

14 Claims, 8 Drawing Sheets

FIX TWO-DIMENSIONAL DIFFRACTION OPTICS

ROTATE TWO-DIMENSIONAL DIFFRACTION OPTICS (3000rpm)

ILLUMINATION APPARATUS AND ILLUMINATION METHOD

BACKGROUND OF THE INVENTION

1. Field of the Invention

The present invention relates to an illumination apparatus and an illumination method, and more particularly, to an illumination apparatus and an illumination method performing illumination with diffraction beam.

2. Description of Related Art

An illumination apparatus employing a laser source is typically used in an optical apparatus such as an inspection apparatus, a projector, or an exposure apparatus. The laser source is typically a point light source, which makes it difficult to perform uniform surface illumination (area illumination). However, it is preferable to perform surface illumination in uniform light intensity distribution when an object is illuminated. Therefore, an optical system called uniformizing optical system is sometimes used as the light source used in the inspection apparatus or the exposure apparatus or the like. More specifically, the optical system called fly-eye lens or kaleidoscope is widely used as the uniformizing optical system. The uniformizing optical system is described in "Optical Technique Contact", Vol. 33, No. 2, pp. 41-44 (1995), for example. The optical apparatus uniformizing the beam with a plurality of optical fibers is also disclosed in Japanese Unexamined Patent Application Publication No. 2005-308967.

However, a micro fly-eye lens is needed in the optical system with narrow field. In the conventional technique, it is difficult to form such a micro fly-eye lens with high accuracy. Further, coherence length of the laser beam increases because the laser beam has narrow spectrum width. Therefore, when the laser source is used as the light source for illumination, speckle (patchy pattern of dark spots and bright spots) is generated due to the temporal coherence of the laser beam, which causes noise on the image. Therefore, in the conventional illumination apparatus, it is difficult to decrease the speckle noise by the uniform illumination.

An object of the present invention is to provide an illumination apparatus and an illumination method that can decrease the speckle noise and achieve uniform illumination.

SUMMARY OF THE INVENTION

According to a first aspect of the present invention, there is provided an illumination apparatus including a laser source, a two dimensional diffraction optics on which laser beam from the laser source is made incident, an optical guiding member on which diffraction beams from the two dimensional diffraction optics are made incident and through which incident beams travel while repeating total reflection, and a changing part changing an incident position of the diffraction beams from the two dimensional diffraction optics in an incident end surface of the optical guiding member. By this configuration, it is possible to decrease speckle noise and to achieve uniform illumination.

According to a second aspect of the present invention, the optical guiding member and the two dimensional diffraction optics are integrally formed in the illumination apparatus. By this configuration, it is possible to achieve uniform illumination with a simple configuration.

According to a third aspect of the present invention, the optical guiding member and the two dimensional diffraction optics are integrally formed by injection molding in the illumination apparatus. By this configuration, it is possible to reduce cost of components.

According to a fourth aspect of the present invention, the two dimensional diffraction optics diffracts the laser beam so as to produce circular illumination pattern in the illumination apparatus. By this configuration, it is possible to achieve uniform illumination.

According to a fifth aspect of the present invention, the two dimensional diffraction optics diffracts the laser beam so as to produce quadrupole illumination pattern in the illumination apparatus. By this configuration, it is possible to improve resolution at a certain pattern.

According to a sixth aspect of the present invention, the two dimensional diffraction optics diffracts the laser beam so as to produce ring-shaped illumination pattern in the illumination apparatus. By this configuration, it is possible to improve resolution.

According to a seventh aspect of the present invention, the changing part includes a galvano mirror changing the incident position of the laser beam in the incident end surface of the optical guiding member depending on time in the illumination apparatus. By this configuration, it is possible to decrease the speckle noise with the simple configuration.

According to an eighth aspect of the present invention, the two dimensional diffraction optics is reflective two dimensional diffraction optics, and the changing part changes the incident angle of the laser beam input to the two dimensional diffraction optics depending on time in the illumination apparatus. By this configuration, it is possible to decrease the speckle noise with the simple configuration.

According to a ninth aspect of the present invention, the changing part includes a transparent plate provided between the two dimensional diffraction optics and the optical guiding member so as to change the incident angle of the beams input to the transparent plate depending on time in the illumination apparatus. By this configuration, it is possible to decrease the speckle noise with the simple configuration.

According to a tenth aspect of the present invention, the changing part rotates the two dimensional diffraction optics so as to change the incident position of the laser beam in the two dimensional diffraction optics depending on time in the illumination apparatus. By this configuration, it is possible to decrease the speckle noise with the simple configuration.

According to an eleventh aspect of the present invention, the two dimensional diffraction optics is rotated by a hollow motor so that the laser beam emitted from the laser source is made incident on a hollow part of the hollow motor in the illumination apparatus. By this configuration, it is possible to decrease the two dimensional diffraction optics and to reduce cost of components.

According to a twelfth aspect of the present invention, the changing part includes a diffuser plate diffusing the incident beams and changes the incident position of the diffraction beams in the incident end surface of the optical guiding member by rotating the diffuser plate in the illumination apparatus. By this configuration, it is possible to decrease the speckle noise with the simple configuration.

According to a thirteenth aspect of the present invention, an emitting end surface of the optical guiding member is arranged at conjugated position to an image plane in the illumination apparatus. By this configuration, it is possible to achieve uniform illumination.

According to a fourteenth aspect of the present invention, there is provided an illumination method including a process for making laser beam incident on a two dimensional diffraction optics, a process for making diffraction beams from the two dimensional diffraction optics incident on an optical guiding member through which incident beams travel while repeating total reflection, and a process for performing illumination by the beams emitted from the optical guiding member while changing the incident position of the diffraction beams from the two dimensional diffraction optics in the incident end surface of the optical guiding member. By this configuration, it is possible to decrease the speckle noise and to achieve uniform illumination.

According to the present invention, it is possible to provide the illumination apparatus and the illumination method that can decrease the speckle noise and achieve uniform illumination.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE PREFERRED EMBODIMENTS

The embodiments of the present invention will be described hereinafter in detail with reference to the drawings. The description is made below for the purpose of showing the preferred embodiments of the invention. The scope of the present invention is not limited to the embodiments described below. In the description below, the components to which the same signals are given substantially indicate the same elements.

First Embodiment

Figure 1:
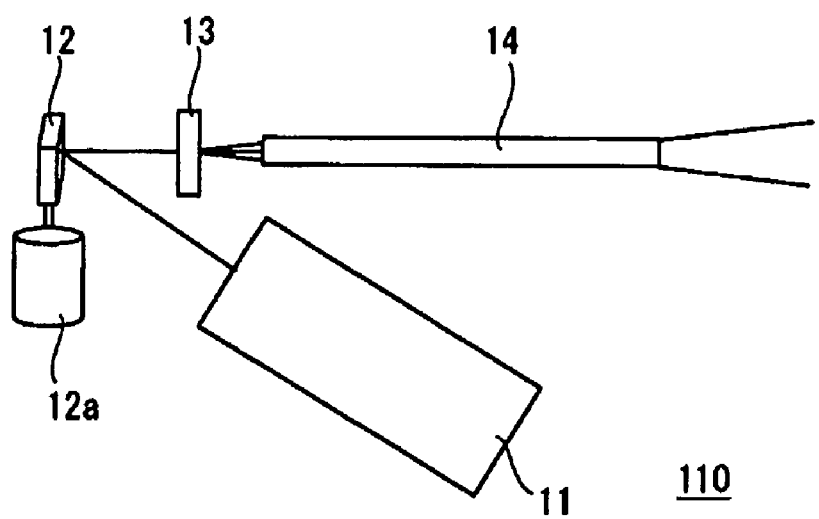
FIG. 1 is a diagram showing a configuration of an illumination apparatus according to a first embodiment of the present invention.

An illumination apparatus according to the present embodiment will be described with reference to FIG. 1. FIG. 1 is a diagram showing a configuration of the illumination apparatus according to the present embodiment. The illumination apparatus according to the present embodiment is used in an optical apparatus such as an inspection apparatus imaging samples, a projector, or an exposure apparatus. In summary, the illumination apparatus according to the present embodiment is applicable to the apparatus performing surface illumination (area illumination).

The illumination apparatus according to the present embodiment includes a laser source 11, a galvano mirror 12, a two dimensional diffraction optics 13, and a rectangular rod 14. The laser source 11 emits coherent laser beam. A wavelength of the laser source 11 can be selected according to the illumination applications. We assume here that the laser source 11 emits the laser beam having the wavelength of 193 nm. As a matter of course, the illumination can also be performed using visible light instead of using ultraviolet light. A collimated laser beam is emitted from the laser source 11. Therefore, a parallel light flux is emitted from the laser source 11. The laser beam emitted from the laser source 11 is made incident on the galvano mirror 12. The galvano mirror 12 reflects the incident laser beam in a direction of the two dimensional diffraction optics 13. A driving mechanism 12a is provided in the galvano mirror 12. The driving mechanism 12a changes the reflection surface of the galvano mirror 12 at a certain period. In summary, the galvano mirror 12 has the reflection surface whose angle is changed at a certain period. Therefore, the reflection direction of the laser beam varies, which makes it possible to perform fine scanning on the laser beam.

The laser beam reflected in the galvano mirror 12 is made incident on the two dimensional diffraction optics 13. A predetermined diffraction grating pattern is formed in the two dimensional diffraction optics 13. The two dimensional diffraction optics 13 is the transmissive diffraction grating. Therefore, when the laser beam is made incident on the two dimensional diffraction optics 13, the diffraction beams are emitted from the surface opposite to the incident surface. The diffraction beams are emitted at a certain angle of beam spread. The two dimensional diffraction optics 13 generates a plurality of diffraction beams from one laser beam so as to form two-dimensional multi spots. In summary, the laser beam is converted to a plurality of multi-spot beams by the two dimensional diffraction optics 13. Then the multi-spot beams that are circularly arranged are emitted from the two dimensional diffraction optics 13. For example, the multi-spot beams having a maximum of about one hundred spots are diametrically arranged. The two dimensional diffraction optics 13 is designed to have the diffraction angle same to or slightly larger than the NA that is required. A part of each optical beam may be overlapped with the other adjacent optical beams. The pattern of the multi-spot beams that are emitted from the two dimensional diffraction optics 13 is not limited to the circular pattern.

The multi-spot beams emitted from the two dimensional diffraction optics 13 are made incident on the end surface of the rectangular rod 14 which is an optical guiding member. The incident beams that are made incident on the rectangular rod 14 travel inside the rectangular rod 14 while repeating the total reflection. Then the light is emitted from the end surface that is opposite to the incident side surface of the rectangular rod 14. The surface of the rectangular rod 14 on which the laser beams are incident is called incident end surface, and the surface from which the laser beams are emitted is called emitting end surface. Therefore, the diffraction beams from the two dimensional diffraction optics 13 are made incident on the rectangular rod 14 from the incident end surface of the rectangular rod 14. The diffraction beams travel inside the rectangular rod 14 while repeating the total reflection and are emitted from the emitting end surface of the rectangular rod 14. Therefore, the spatial light intensity distribution of the incident beams is uniformized inside the rectangular rod 14. Note that the rectangular rod 14 and the two dimensional diffraction optics 13 are disposed separately to the extent that the multi-spot beams from the two dimensional diffraction optics 13 are made incident on the rectangular rod 14. As a matter of course, not all of the multi-spot beams need to be made incident on the rectangular rod 14 but only a part of the multi-spot beams may be made incident on the rectangular rod 14.

Figure 2:
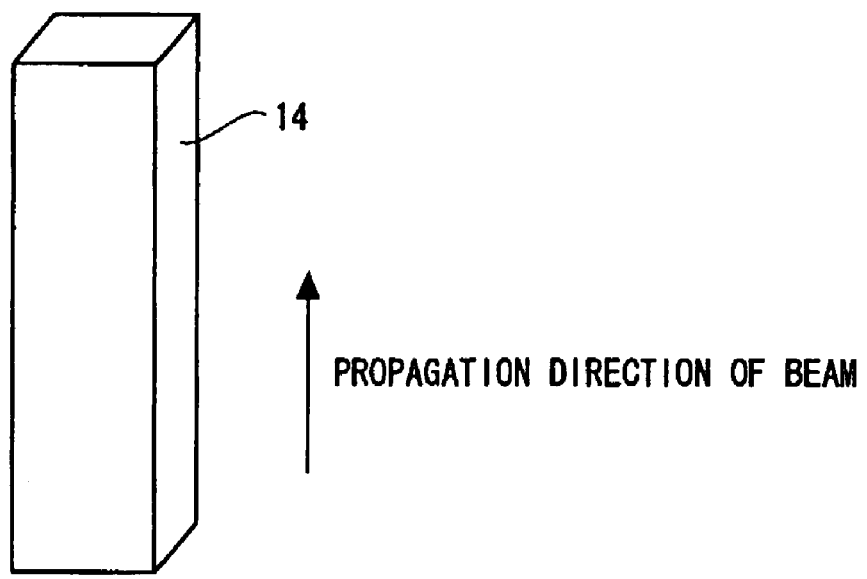
FIG. 2 is a diagram showing a configuration of a rectangular rod used in the illumination apparatus according to the present invention.

Now, a configuration of the rectangular rod 14 is described with reference to FIG. 2. FIG. 2 shows a schematic configuration diagram of the rectangular rod 14 used in the illumination apparatus according to the present embodiment. FIG. 2 is a perspective view showing a configuration of the rectangular rod 14. The rectangular rod 14 has a quadrangular prism shape. A longitudinal direction of the rectangular rod 14 is the propagation direction of the light. The rectangular rod 14 is formed by a transparent material having a high refraction index, for example. Note that the material of the rectangular rod 14 may be any so long as the refraction index thereof is higher than the ambient (air, for example). The light made incident on the rectangular rod 14 travels inside thereof. Therefore, the incident beams travel while being totally reflected in the side surface of the rectangular rod 14. This total reflection uniformizes the light intensity distribution of the diffraction beams which are made incident on the rectangular rod 14.

For example, the rectangular rod 14 is formed by quartz, fluoride, or resin or the like. The rectangular rod 14 has a rectangular cross-sectional shape. Therefore, even when the light having a non-uniform light intensity distribution is made incident on the rectangular rod 14, the light having the uniform light intensity distribution can be emitted from the emitting end surface of the rectangular rod 14. When the rectangular rod 14 is formed by the fluoride, it is possible to propagate far-ultraviolet light having a wavelength less than 200 nm. This is because the fluoride has extremely high band gap energy and therefore the far-ultraviolet light of this wavelength region is not absorbed by the rectangular rod 14.

Note that the specific composition of the fluoride includes calcium fluoride, magnesium fluoride, barium fluoride, barium lithium fluoride, lithium yttrium fluoride, lithium strontium aluminum fluoride, lithium calcium aluminum fluoride, and lithium strontium gallium fluoride.

The spatially uniform distribution light is emitted from the emitting end surface by using the rectangular rod 14 thus configured. Therefore, the light which is made incident from the incident end surface travels while repeating the total reflection in the rectangular rod 14. Therefore, the multi-spot beams which are made incident from various incident positions are mixed inside the rectangular rod 14. Further, the multi-spot beams have a certain angle of spread, which means the multi-spot beams are overlapped in the emitting end surface. The distance between the two dimensional diffraction optics 13 and the rectangular rod 14 is regulated so that the light intensity distribution of the emitting end surface is uniformized. Even when the light having a non-uniform light intensity distribution is made incident on the incident end surface, the light intensity distribution is uniformized at the emitting end surface. Therefore, it is possible to obtain the optical beams having the uniform spatial light intensity distribution by making the multi-spot beams incident on one rectangular rod 14. It is also possible to further uniformize the light intensity distribution by increasing the length of the rectangular rod 14. Further, it is possible to limit the emit angle of the illumination light by using the light traveled through the rectangular rod 14. Therefore, the light is not traveled in the angle over the angle of the total reflection determined by the refraction index of the rectangular rod 14 and the reflection index of the ambient. The passing of the light which tilts more than a predetermined angle from the central axis of the rectangular rod 14 is limited. The angle distribution of the illumination light can be thus limited.

In the present embodiment, the galvano mirror 12 is used to finely scan the laser beam, as stated above. Therefore, the incident position of the laser beams in the two dimensional diffraction optics 13 varies. The position of the diffraction beams of the multi spots in the incident end surface of the rectangular rod 14 also varies. Therefore, the incident position of the diffraction beams on the rectangular rod 14 varies depending on time. The scanning distance by the galvano mirror 12 may be such that the spot of one diffraction beam moves to the adjacent spot on the incident end surface. Therefore, it is possible to increase the scan period. For example, it is possible to perform scanning at 7.5 KHz. As described, the incident position of the diffraction beams on the incident end surface is changed by changing the incident position of the diffraction beams at a certain period. In the present embodiment, illumination is performed by the light emitted from the rectangular rod 14 while changing the incident position of the diffraction beams from the two dimensional diffraction optics 13 at the incident end surface of the rectangular rod 14. Therefore, the emitting position of the diffraction beams on the emitting end surface also varies, which makes it possible to decrease the speckle noise with the simple configuration.

For example, in the inspection apparatus using the imaging apparatus such as a CCD camera, the scan period of the galvano mirror 12 can be more than the frame period of the CCD camera. Therefore, the scan period of the galvano mirror 12 can be more than 10 Hz, for example. Further, it is preferable to perform scanning at a period of 1/integral number of integral time of the CCD camera. Hence, illumination can be made in a same light intensity in each frame. It is possible to achieve uniform illumination by using the illumination apparatus according to the present embodiment. More specifically, the emitting end surface of the rectangular rod 14 is disposed at conjugated position to the sample plane, which makes it possible to achieve the uniform surface illumination. As described above, the emitting end surface of the rectangular rod 14 is disposed at conjugated position to the image plane. Further, the illumination light pattern on a pupil is made to coincide with a far field pattern of the two dimensional diffraction optics 13. Therefore, the conjugated position to the pupil is made far field of the two dimensional diffraction optics 13.

Figure 3:
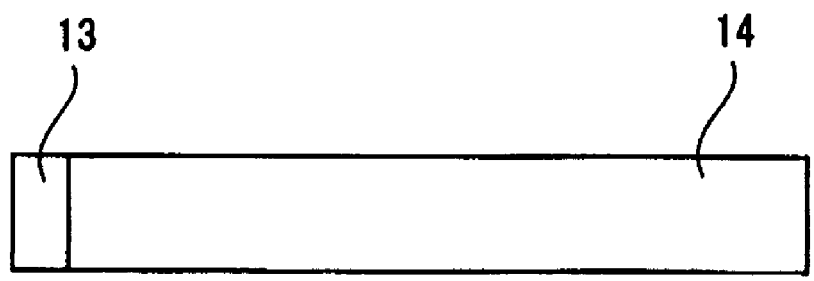
FIG. 3 is a diagram showing a variation of the rectangular rod used in the illumination apparatus according to the present invention.

Further, in the present embodiment, the two dimensional diffraction optics 13 and the rectangular rod 14 can be integrally formed as shown in FIG. 3. Therefore, the two dimensional diffraction optics 13 is formed in the incident end surface of the rectangular rod 14, which makes it possible to reduce the number of components. For example, the two dimensional diffraction optics 13 and the rectangular rod 14 can be integrally formed by injection molding. In such a case, the two dimensional diffraction optics 13 and the rectangular rod 14 are formed by plastic having appropriate refraction index, which can reduce the cost of the components. Further, since all the multi-spot beams emitted from the two dimensional diffraction optics 13 are made incident on the rectangular rod 14, beam loss can be decreased.

Second Embodiment

Figure 4:
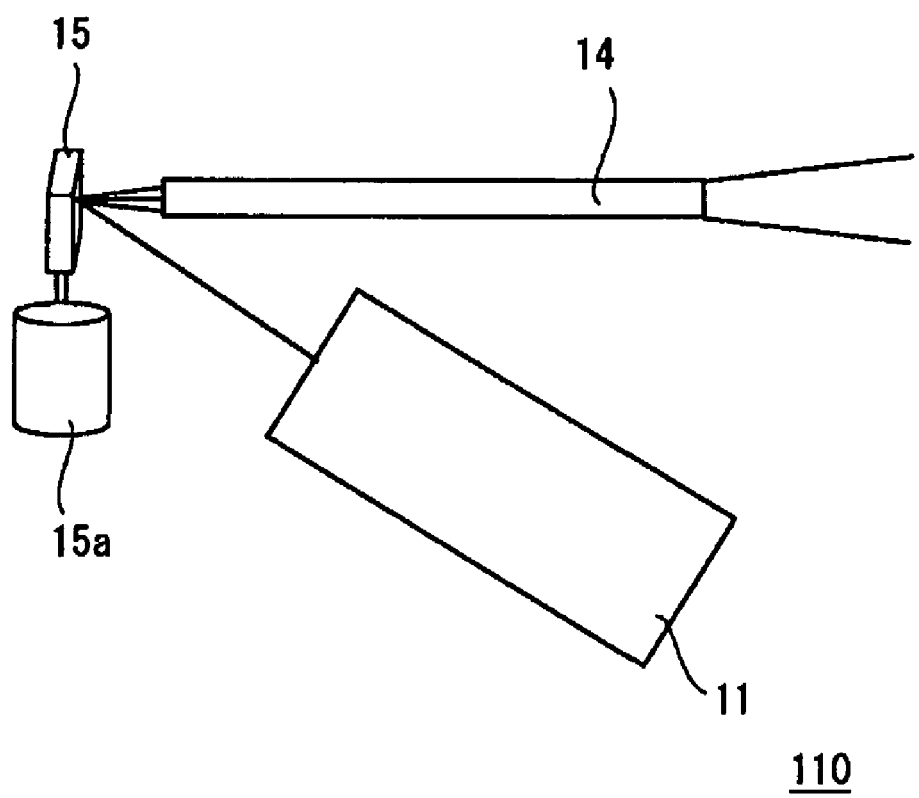
FIG. 4 is a diagram showing a configuration of the illumination apparatus according to a second embodiment of the present invention.

The illumination apparatus according to the present embodiment will be described with reference to FIG. 4. FIG. 4 is a diagram showing a configuration of the illumination apparatus according to the present embodiment. In the present embodiment, a reflective two dimensional diffraction optics 15 is used instead of using the two dimensional diffraction optics 13 of the first embodiment. Further, angle of the reflective two dimensional diffraction optics 15 is scanned instead of performing scanning by the galvano mirror 12. Other configurations are similar to the configurations of the first embodiment. Therefore, the overlapping description is omitted.

As shown in FIG. 4, the laser beam emitted from the laser source 11 is made incident on the reflective two dimensional diffraction optics 15 in the present embodiment. The reflective two dimensional diffraction optics 15 reflects the incident beam and generates the multi-spot beams. Therefore, the multi-spot diffraction beams are generated from one laser beam. The multi-spot beams reflected by the reflective two dimensional diffraction optics 15 are made incident on the rectangular rod 14. The rectangular rod 14 is the same to the rectangular rod described in the first embodiment. Therefore, the optical beams emitted from the rectangular rod 14 are uniformized as in the first embodiment.

Note that a driving mechanism 15a is provided in the reflective two dimensional diffraction optics 15. The driving mechanism 15a changes the angle of the reflective two dimensional diffraction optics 15 to the laser beam. Therefore, the incident angle of the laser beam to the reflective two dimensional diffraction optics 15 is changed depending on time by driving the driving mechanism 15a. The angle of the reflective two dimensional diffraction optics can be changed by driving the driving mechanism 15a at a certain period. Therefore, the incident position of the multi-spot beams in the incident end surface of the rectangular rod 14 varies depending on time. By driving the angle of the two dimensional diffraction optics as in the galvano mirror 12 of the first embodiment, it is possible to easily decrease the speckle noise. Therefore, the same effect as in the first embodiment can be obtained.

Third Embodiment

The illumination apparatus according to the present embodiment is described with reference to FIG. 5. In the present embodiment, a transparent plate 16 is provided in place of the galvano mirror 12 of the first embodiment. The transparent plate 16 is formed by a transparent glass plate, for example. A driving mechanism 16a is provided in the transparent plate 16. Other configurations are the same as the configurations of the first embodiment. Therefore, overlapping description is omitted.

Figure 5:
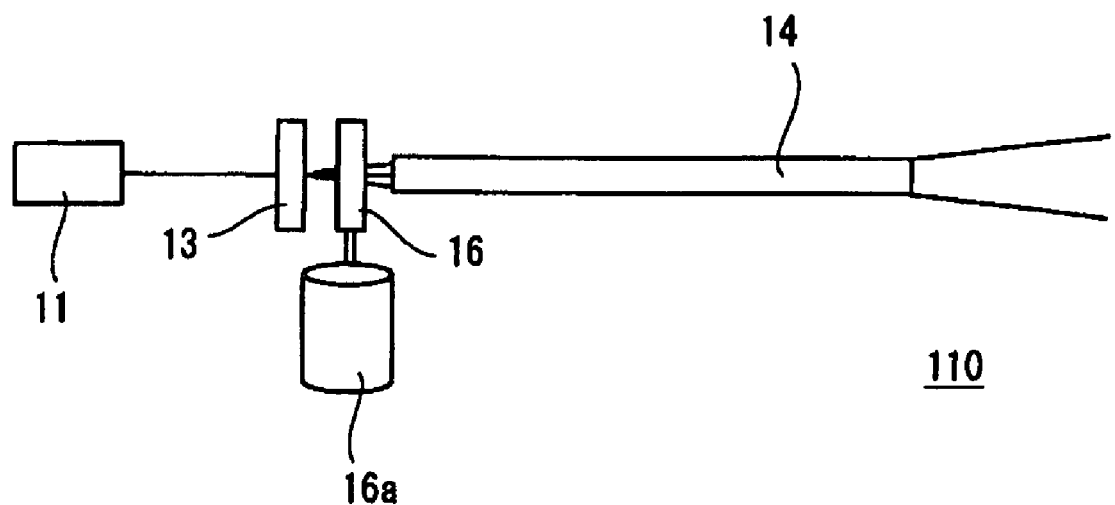
FIG. 5 is a diagram showing a configuration of the illumination apparatus according to a third embodiment of the present invention.

As shown in FIG. 5, the laser beam emitted from the laser source 11 is made incident on the two dimensional diffraction optics 13. The two dimensional diffraction optics 13 is the transmissive two-dimensional diffraction optics 13 as in the first embodiment. The multi-spot beams emitted from the two dimensional diffraction optics 13 are made incident on the transparent plate 16. The multi-spot beams transmitted through the transparent plate 16 are made incident on the rectangular rod 14, where the light intensity distribution is uniformized. The optical axis of the laser source 11 and the central axis of the rectangular rod 14 are made to coincide with each other.

Further, a driving mechanism 16a is provided in the transparent plate 16. The driving mechanism 16a changes the angle of the transparent plate 16. The multi-spot beams are refracted by the transparent plate 16. The refraction angle of the multi-spot beams is changed depending on the angle of the transparent plate 16. Therefore, the optical axis of the diffraction beams is changed. In summary, when the driving mechanism 16a is driven, the incident angle of the laser beams to the transparent plate 16 varies. The multi-spot beams is scanned, and the incident position of the multi-spot beams in the incident end surface of the rectangular rod 14 is changed depending on time, which makes it possible to decrease the speckle noise. Therefore, the same effect as in the first and second embodiments can be obtained. Instead of providing the transparent plate 16 between the rectangular rod 14 and the two dimensional diffraction optics 13, it may also be provided between the laser source 11 and the two dimensional diffraction optics 13.

Fourth Embodiment

The illumination apparatus according to the present embodiment is described with reference to FIG. 6. In the present embodiment, a two dimensional diffraction optics 17 is provided in place of the two dimensional diffraction optics 13 in the first embodiment. The two dimensional diffraction optics 17 can be rotated by a driving mechanism 17a. Therefore, the two dimensional diffraction optics 17 is rotated in the present embodiment instead of performing scanning by the galvano mirror 12.

Figure 6:
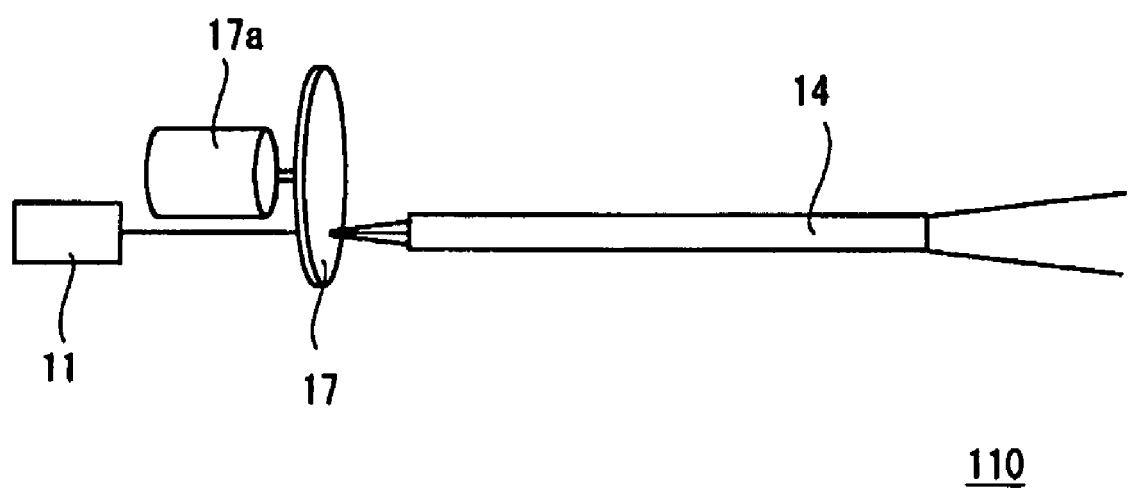
FIG. 6 is a diagram showing a configuration of the illumination apparatus according to a fourth embodiment of the present invention.

As shown in FIG. 6, the laser beam emitted from the laser source 11 is made incident on the two dimensional diffraction optics 17. The two dimensional diffraction optics 17 generates the multi-spot beams as described above. These multi-spot beams are made incident on the incident end surface of the rectangular rod 14. Note that the optical axis of the laser source 11 and the central axis of the rectangular rod 14 are made to coincide with each other. The two dimensional diffraction optics 17 has disk shape. The center of the two dimensional diffraction optics 17 and the incident position of the laser beam are out of line with each other. The driving mechanism 17a is provided in the two dimensional diffraction optics 17. This driving mechanism 17a rotates the two dimensional diffraction optics 17 around the rotation axis which is the center of the two dimensional diffraction optics 17. Therefore, when the two dimensional diffraction optics 17 is rotated by the driving mechanism 17a, the laser beam is made incident on the various positions of the two dimensional diffraction optics. In summary, the laser beam is made incident on the two dimensional diffraction optics 17 in the position depending on the rotation angle.

Note that a predetermined diffraction grating pattern is formed in the two dimensional diffraction optics 17. This diffraction grating pattern determines the diffraction angle of the diffraction beams. Therefore, the diffraction grating pattern in the position where the laser beam is incident changes the emit angle of the diffraction beams. When the two dimensional diffraction optics is rotated as described above, the laser beam is made incident on the various positions of the diffraction grating pattern of the two dimensional diffraction optics 17. The diffraction angle varies depending on the rotation angle. Therefore, the position of the pattern of the multi spots emitted from the two dimensional diffraction optics 17 is changed depending on time, which makes it possible to change the incident position of the multi-spot beams at the incident end surface of the rectangular rod 14. It is possible to decrease the speckle noise in a simple way. Therefore, the same effect as in the above-described embodiments can be obtained.

When a typical surface illumination is performed, the diffraction grating pattern of the two dimensional diffraction optics is designed so that the illumination can be performed in a circular shape less than the size of the pupil. The size of the circle is made to coincide with a partial coherent factor (sigma). Therefore, the diffraction angle of the diffraction beams of the two dimensional diffraction optics or the like is designed so that the pattern of the multi-spot beams of the diffraction beams is provided in circular shape. Then the circular pattern is made to coincide with the partial coherent factor.

Figure 7A:
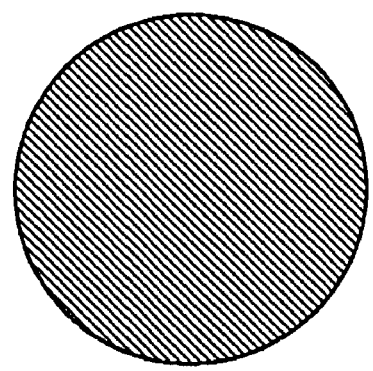
FIGS. 7A to 7D each shows an illumination pattern in the illumination apparatus according to the fourth embodiment of the present invention.
Figure 7B:
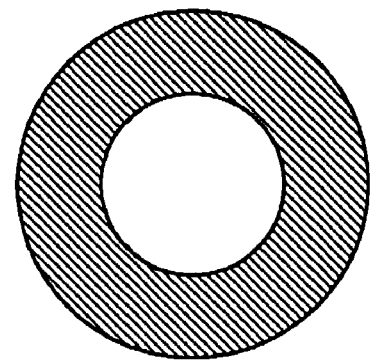
Figure 7C:
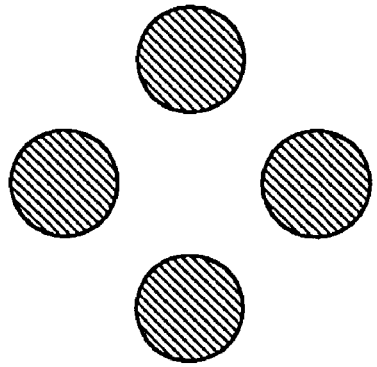
Figure 7D:
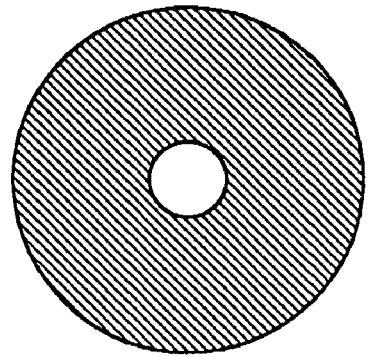

It is also possible to perform modified illumination by modifying the diffraction grating pattern of the two dimensional diffraction optics 17. The modified illumination will be described with reference to FIGS. 7A to 7D. FIGS. 7A to 7D each shows the far field pattern of the two dimensional diffraction optics. FIG. 7A shows the pattern of the typical circular illumination and FIGS. 7B to 7D show three different pattern examples of the modified illumination. As shown in FIG. 7A, the circular illumination pattern can be formed by the diffraction grating pattern of the two dimensional diffraction optics. This circular illumination pattern is formed by the multi-spot beams. For example, the adjacent optical beams are provided at a certain pitch to diametrically dispose about one hundred optical beams. The outermost optical beams are arranged on a same circumference, which makes it possible to form the circular illumination pattern as shown in FIG. 7A.

As shown in FIG. 7B, it is also possible to form the pattern of orbicular zone illumination by the diffraction grating pattern of the two dimensional diffraction optics. As shown in FIG. 7C, it is also possible to form a quadrupole illumination pattern. Further, when a reflecting objective lens or a catadioptrical objective lens is used, it is possible to perform illumination so as to be made coincide with the obscuration in the central part of the pupil as shown in FIG. 7D. In FIG. 7D, the ring-shaped pattern is formed so as to be made coincide with the obscuration in the central part of the pupil. The illumination pattern on the pupil can be any shape, which makes it possible to effectively use the light emitted from the light source. It is possible to decrease the light loss according to the light stopped by an aperture stop.

The pattern shown in FIGS. 7B to 7D is made incident on the incident end surface of the rectangular rod 14. In order to form such a pattern, 0-order diffraction beam is made weak and the higher-order diffraction beam is made stronger. Therefore, the higher-order diffraction beam is made stronger than the 0-order diffraction beam. By doing this, it is possible to decrease the beam traveling in parallel with the central axis of the rectangular rod and increase the light inclined to the central axis. In summary, the angle distribution of the illumination light can be controlled by changing the design pattern of the two dimensional diffraction optics. NA (numerical aperture) of the illumination optical system can be increased by employing such a modified illumination. It is possible to improve the resolution of the exposure apparatus or the like to form the fine pattern. In the exposure apparatus, the emitting end surface of the rectangular rod 14 is disposed at conjugated position to a reticle or photo mask. As stated, by changing the diffraction grating pattern of the two dimensional diffraction optics, the ring-shaped illumination pattern can be formed as shown in FIGS. 7B and 7D, or the quadrupole illumination pattern can be formed as shown in FIG. 7C. Thus, the resolution of the exposure apparatus or the like can be improved.

Fifth Embodiment

Figure 8:
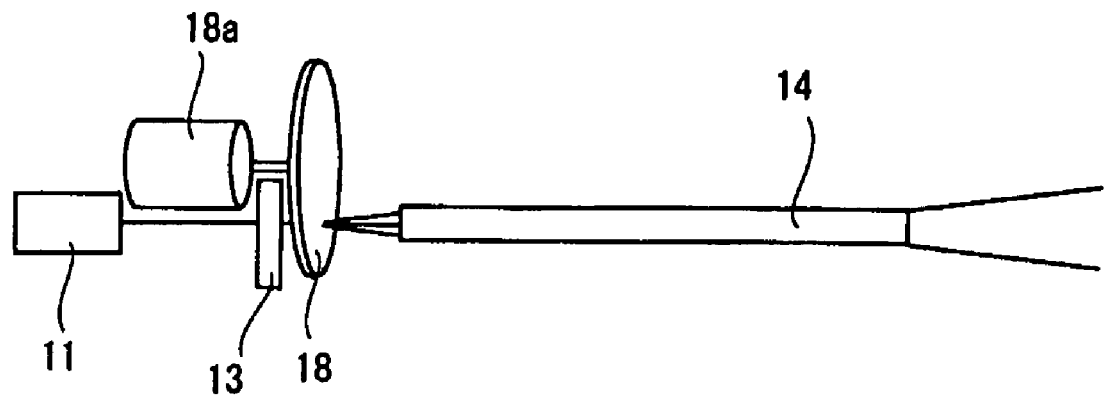
FIG. 8 is a diagram showing a configuration of the illumination apparatus according to a fifth embodiment of the present invention.

The illumination apparatus according to the present embodiment is described with reference to FIG. 8. In the present embodiment, a diffuser plate 18 is provided instead of galvano mirror of the first embodiment. The diffuser plate 18 can be rotated by a driving mechanism 18a. Therefore, the diffuser plate 18 is rotated instead of performing scanning by the galvano mirror 12.

The laser beam emitted from the laser source 11 is made incident on the two dimensional diffraction optics 13. The two dimensional diffraction optics 13 is the transmissive two dimensional diffraction optics 13 as in the first embodiment. Therefore, the plurality of diffraction beams are emitted from the two dimensional diffraction optics 13. Therefore, the multi-spot beams of the diffraction beams are generated. The multi-spot beams emitted from the two dimensional diffraction optics 13 are made incident on the diffuser plate 18. The diffuser plate 18 diffuses the incident beams. Therefore, the multi-spot beams of the diffraction beams are diffused by the diffuser plate 18. Therefore, the diffraction beams are reflected by the difference of the refraction index in the diffuser plate 18 and are diffused. The multi-spot beams diffused by the diffuser plate 18 are made incident on the rectangular rod 14. Thus, the light intensity distribution can be uniformized.

The driving mechanism 18a is provided in the diffuser plate 18. The driving mechanism 18a rotates the diffuser plate 18. Further, the center of the disc-shaped diffuser plate 18 and the incident position of the laser beams are out of line with each other. Therefore, when the driving mechanism 18a rotates the diffuser plate 18, the diffraction beams are made incident on the various positions on the diffuser plate 18. When the diffraction beams are made incident on the various positions on the diffuser plate 18, the emit angle of the diffraction beams slightly varies. Therefore, the incident position of the multi-spot beams at the incident end surface of the rectangular rod 14 varies depending on time, which makes it possible to decrease the speckle noise. Instead of providing the diffuser plate 18 between the two dimensional diffraction optics 13 and the rectangular rod 14, it may also be provided between the laser source 11 and the two dimensional diffraction optics 13.

Sixth Embodiment

Figure 9:
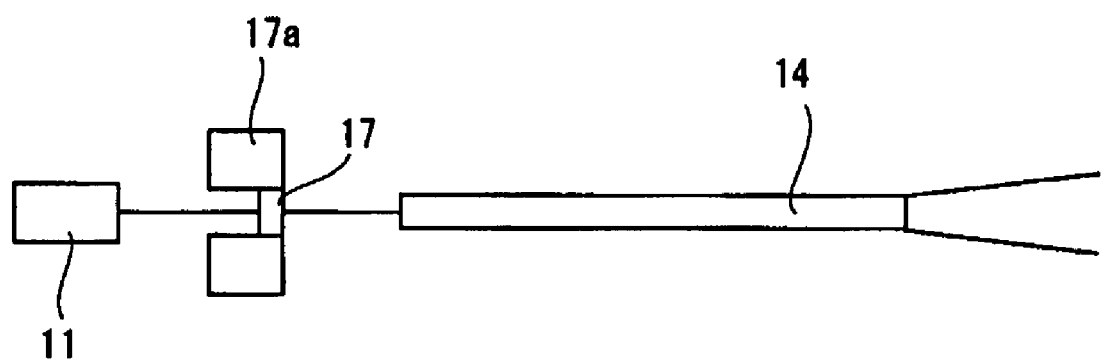
FIG. 9 is a side view showing a configuration of the illumination apparatus according to a sixth embodiment of the present invention.

The illumination apparatus according to the present embodiment is described with reference to FIG. 9. In the present embodiment, the driving mechanism 17a of the illumination apparatus according to the fourth embodiment is changed. Other configurations than the driving mechanism 17a are the same to the configurations of the above-described embodiments, and therefore the overlapping description is omitted.

In the present embodiment, a hollow motor whose rotation axis is hollow is used as the driving mechanism 17a. The laser beam is made incident on the hollow part of the hollow motor. Further, the two dimensional diffraction optics 17 is provided in the hollow part. Therefore, the laser beam passing through the hollow part of the hollow motor is made incident on the two dimensional diffraction optics 17. Hence, the laser beam can be made incident on the two dimensional diffraction optics 17 without any loss. The hollow motor rotates the two dimensional diffraction optics 17 at more than 1800 rpm, for example.

The two dimensional diffraction optics 17 can be miniaturized by using the hollow motor as the driving mechanism 17a. For example, the center of the disc-shaped two dimensional diffraction optics 17 is made closer to the rotation axis of the hollow motor. As a matter of course, the center of the disc-shaped two dimensional diffraction optics 17 may be made coincide with the rotation axis of the hollow motor, which makes it possible for the laser beam to be made incident on about the center of the two dimensional diffraction optics 17. It is possible to decrease the size of the two dimensional diffraction optics 17 compared with the configuration of the fourth embodiment. Therefore, when the two dimensional diffraction optics 17 which is somewhat larger than the spot of the laser beam is used, the laser beam does not get out of the two dimensional diffraction optics 17. Therefore, it is possible to make the area forming the diffraction grating pattern as small as the spot of the laser beam, which makes it possible to reduce the cost of the components.

Figure 10:
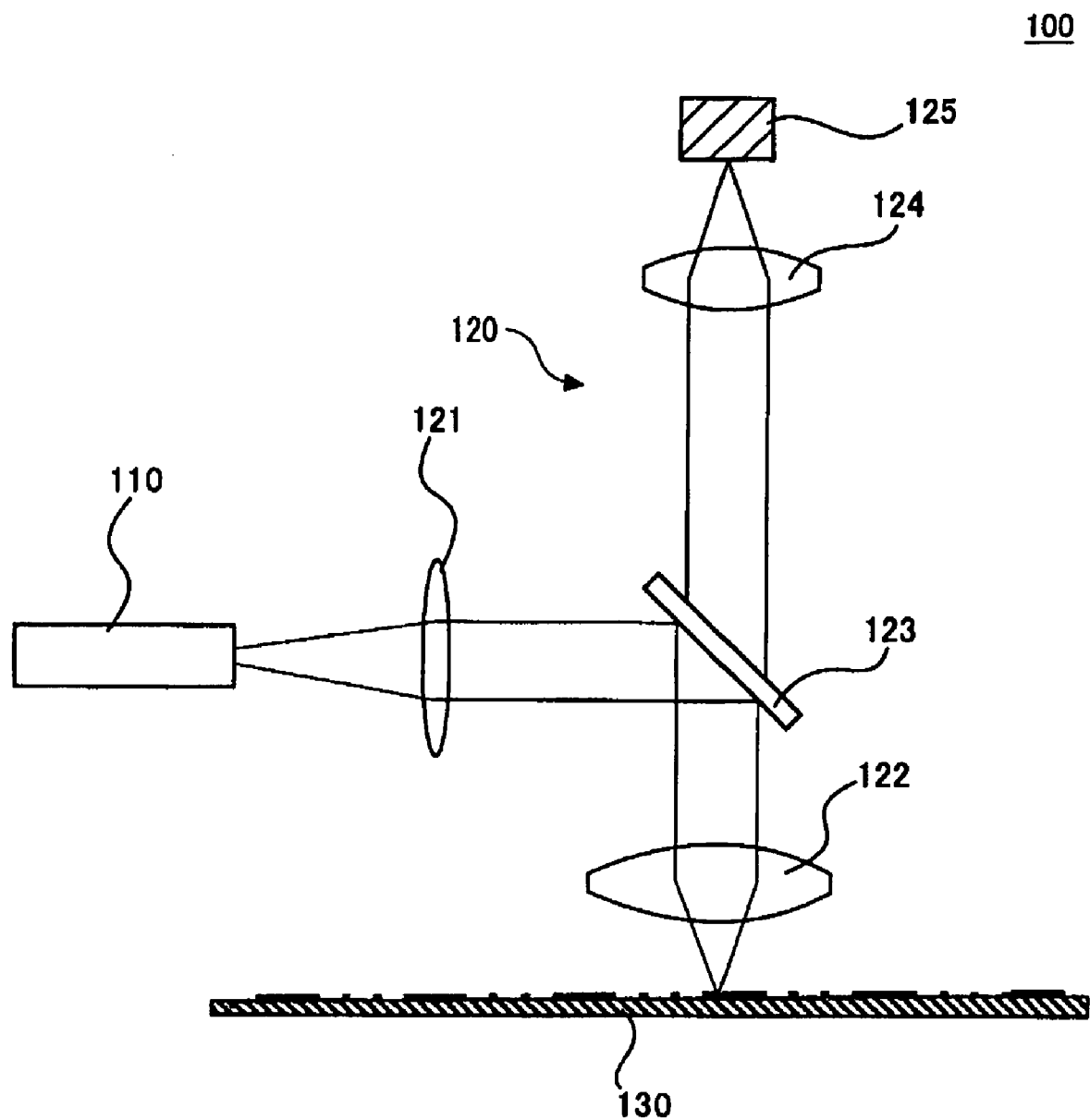
FIG. 10 is a diagram showing a configuration of a mask inspection apparatus using the illumination apparatus according to the present invention.

An example where the illumination apparatus shown in any of the first to sixth embodiments is applied to the inspection apparatus will be described with reference to FIG. 10. FIG. 10 is a schematic configuration diagram showing a configuration of a mask inspection apparatus 100. The mask inspection apparatus 100 includes an illumination apparatus 110 and a defect inspection part 120. The light emitted from the illumination apparatus 110 is made incident on the defect inspection part 120 and is used for the defect inspection on the photo mask.

The defect inspection part 120 includes a lens 121, an objective lens 122, a beam splitter 123, a lens 124, and a two-dimensional photodetector 125. The lens 121 converts light emitted from the illumination apparatus 110 to parallel light. The light converted to the parallel light by the lens 121 is made incident on the beam splitter 123 and is reflected to the objective lens 122 side. The reflected light is focused on the photo mask 130 by the objective lens 122. Therefore, the lens 121 and the objective lens 122 form the projection optical system, and the emitting end surface of the rectangular rod 14 provided in the illumination apparatus 110 is projected on the photo mask 130. Therefore, the laser beam having uniform light intensity distribution is illuminated on the photo mask 130. The emitting end surface of the rectangular rod 14 of the illumination apparatus 110 is disposed at conjugated position to the field. Therefore, the emitting end surface of the rectangular rod 14 is disposed at conjugated position to the image plane. Further, the pattern of the illumination light on the pupil is made to coincide with the far field pattern of the two dimensional diffraction optics. In summary, conjugated position to the pupil is made far field of the two dimensional diffraction optics.

The light is reflected from the photo mask 130 so that the reflected light includes the pattern information on which the laser beam is illuminated. Then the reflected light passes through the objective lens 122. The light converted to the parallel light by the objective lens 122 passes through the beam splitter 123. The light that passed through the beam splitter 123 is focused on the two-dimensional photodetector 125 by the lens 124. Projection optical system is formed in the objective lens 122 and the lens 124. Therefore, the pattern on the photo mask 130 is projected on the two-dimensional photodetector 125 where the pattern is obtained as the image data. The two-dimensional photodetector 125 may be Charge Transfer Device (CCD) or Time Delay Integration (TDI). To be more accurate, TDI means the CCD that performs TDI. The laser beam having the uniform light intensity distribution is illuminated on the photo mask 130 in order to perform the mask inspection, which makes it possible to perform the mask inspection with high-sensitivity. As stated above, uniform illumination can be realized by employing the illumination apparatus 110 according to the embodiments above as the mask inspection apparatus 100. Further, it is possible to decrease the speckle noise, which makes it possible to perform the inspection more accurately.

The above-described illumination apparatus can be applied to an optical apparatus such as an inspection apparatus, an exposure apparatus, or a projector. For example, it is possible to employ the illumination apparatus 110 as the projector for image display. In such a case, the illumination light from the illumination apparatus 110 can be used to one or more illumination light of R (Red), G (Green), and B (Blue). More specifically, the illumination light from the illumination apparatus 110 is used to R from which can obtain high laser beam intensity, and the light from the conventional lamp source is used as the illumination light in G and B. In such a case, the laser beam emitting the red light is used as the laser source 11.

Further, the optical guiding member uniformizing the illumination light is not limited to the above-described rectangular rod 14 but can be any so long as the light travels while repeating total reflection inside thereof. For example, it is possible to employ rod-type integrator that is used in the exposure apparatus. It is also possible to appropriately combine the first to sixth embodiments to employ them. As a matter of course, the present invention is not limited to the described embodiments but can be variously changed without departing from the spirit of the present invention.

EXAMPLE

Figure 11:
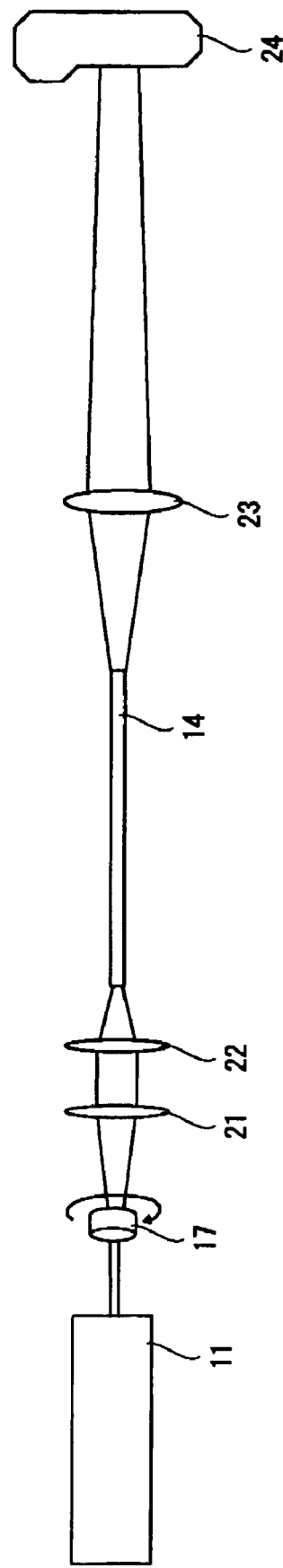
FIG. 11 is a diagram showing a configuration of the illumination apparatus according to an example of the present invention.

The illumination apparatus according to this example is described with reference to FIG. 11. FIG. 11 shows an example of the illumination apparatus shown in the sixth embodiment. In this example, the two dimensional diffraction optics 17 is rotated by the hollow motor. In FIG. 11, the driving mechanism 17a is not shown. A wavelength-variable laser source is used as the laser source 11, and the laser source 11 emits the laser beam having a wavelength of 532 nm. The size of the two dimensional diffraction optics 17 is about 9 mm square, for example. Further, lenses 21 and 22 are provided between the two dimensional diffraction optics 17 and the rectangular rod 14 in this example. The lens 21 has f (focal length) of 70 mm, and the lens 22 has f (focal length) of 47 mm. Therefore, it is possible to make the laser beams incident on the rectangular rod 14. The beams emitted from the rectangular rod 14 are received by the camera 24 through the lens 23. The camera 24 is a two-dimensional photodetector such as the CCD camera, for example. The lens 23 has f (focal length) of 50 mm. The lens 23 images the image of the emitting end surface of the rectangular rod 14 on the receiving surface of the camera 24.

Figure 12A:
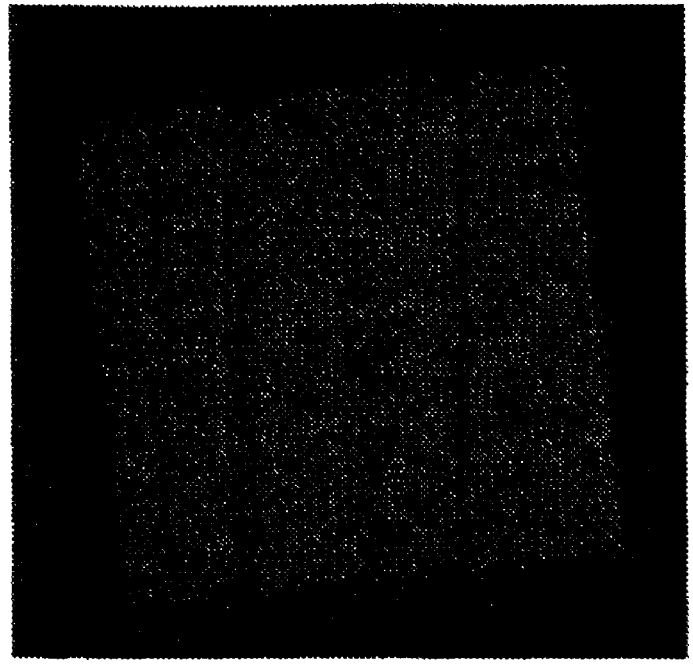
FIGS. 12A and 12B each shows a diagram of an image taken by the illumination apparatus according to the example of the present invention.
Figure 12B:
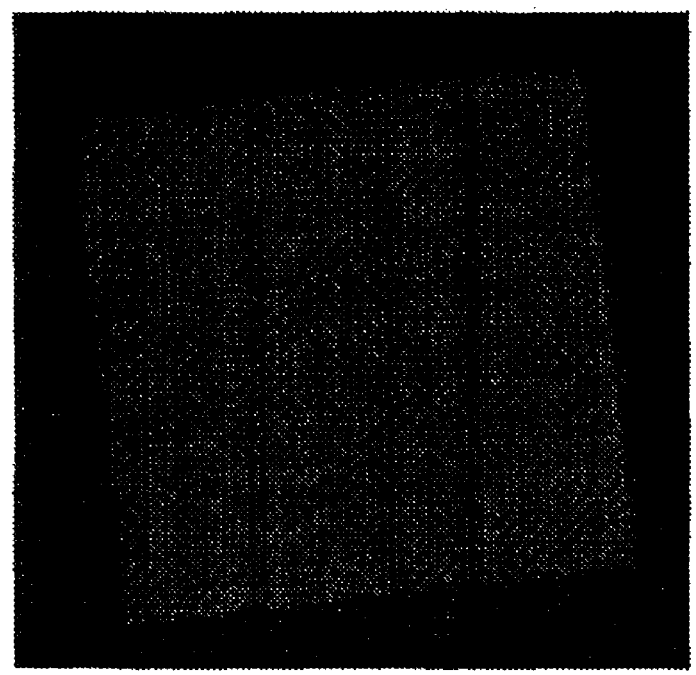

The images of the emitting end surface of the rectangular rod taken by the camera 24 are shown in FIGS. 12A and 12B. An image when the two dimensional diffraction optics 17 is not rotated is shown in FIG. 12A for the purpose of comparison. FIG. 12B shows an image when the two dimensional diffraction optics 17 is rotated. The two dimensional diffraction optics 17 is rotated at 3000 rpm. As shown in FIG. 12A, when the two dimensional diffraction optics 17 is fixed without being rotated, the speckle appears, which means the spots appear at the emitting end surface of the rectangular rod 14 which is taken. On the other hand, as shown in FIG. 12B, the speckle is removed by rotating the two dimensional diffraction optics 17. It is possible to achieve the uniform illumination by employing the above-described illumination apparatus.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An illumination apparatus comprising:
a laser source;
a two dimensional diffraction optics on which laser beam from the laser source is made incident;
an optical guiding member on which a plurality of diffraction beams from the two dimensional diffraction optics are made incident and through which incident beams travel while repeating total reflection; and
a changing part changing an incident position of the diffraction beams from the two dimensional diffraction optics in an incident end surface of the optical guiding member.

2. The illumination apparatus according to claim 1, wherein the optical guiding member and the two dimensional diffraction optics are integrally formed.

3. The illumination apparatus according to claim 2, wherein the optical guiding member and the two dimensional diffraction optics are integrally formed by injection molding.

4. The illumination apparatus according to claim 1, wherein the two dimensional diffraction optics diffracts the laser beam so as to produce circular illumination pattern.

5. The illumination apparatus according to claim 1, wherein the two dimensional diffraction optics diffracts the laser beam so as to produce quadrupole illumination pattern.

6. The illumination apparatus according to claim 1, wherein the two dimensional diffraction optics diffracts the laser beam so as to produce ring-shaped illumination pattern.

7. The illumination apparatus according to claim 1, wherein the changing part includes a galvano mirror changing the incident position of the laser beam in the incident end surface of the two dimensional diffraction optics depending on time.

8. The illumination apparatus according to claim 1, wherein the two dimensional diffraction optics is reflective two dimensional diffraction optics, and
the changing part changes the incident angle of the laser beam input to the two dimensional diffraction optics depending on time.

9. The illumination apparatus according to claim 1, wherein the changing part includes a transparent plate provided between the two dimensional diffraction optics and the optical guiding member so as to change the incident angle of the beams input to the transparent plate depending on time.

10. The illumination apparatus according to claim 1, wherein the changing part rotates the two dimensional diffraction optics so as to change the incident position of the laser beam in the two dimensional diffraction optics depending on time.

11. The illumination apparatus according to claim 10, wherein the two dimensional diffraction optics is rotated by a hollow motor so that the laser beam emitted from the laser source is made incident on a hollow part of the hollow motor.

12. The illumination apparatus according to claim 1, wherein the changing part includes a diffuser plate diffusing the incident beams and changes the incident position of the diffraction beams in the incident end surface of the optical guiding member by rotating the diffuser plate.

13. The illumination apparatus according to claim 1, wherein an emitting end surface of the optical guiding member is arranged at conjugated position to an image plane.

14. An illumination method comprising:
a process for making laser beam incident on a two dimensional diffraction optics;
a process for making a plurality of diffraction beams from the two dimensional diffraction optics incident on an optical guiding member through which incident beams travel while repeating total reflection; and
a process for performing illumination by the beams emitted from the optical guiding member while changing the incident position of the plurality of diffraction beams from the two dimensional diffraction optics in the incident end surface of the optical guiding member.

* * * * *